Dec. 20, 1955  R. E. EKSTROM  2,727,388
FLOW METER
Filed Aug. 2, 1952  3 Sheets-Sheet 1
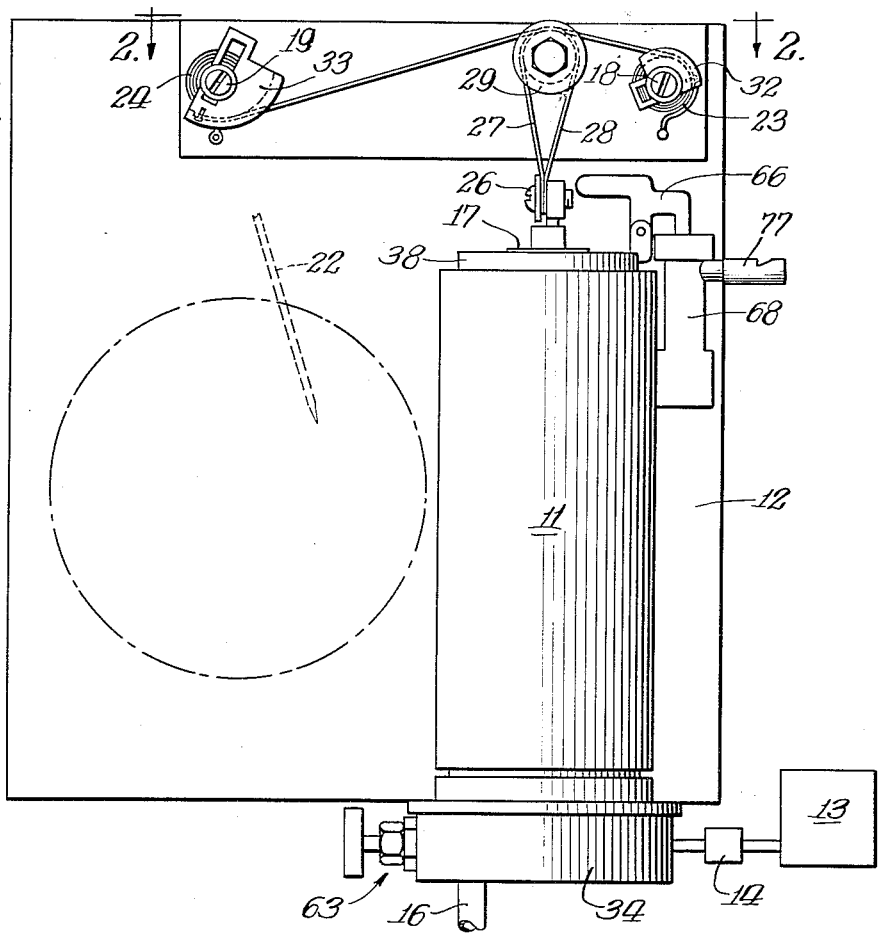
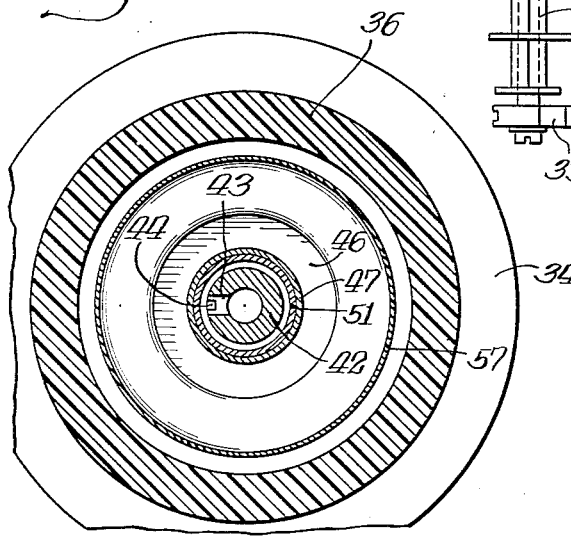
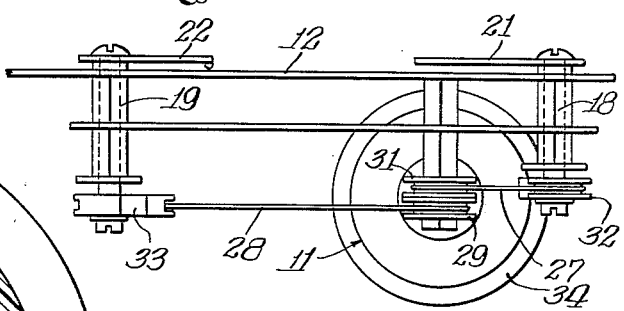
INVENTOR.
Robert E. Ekstrom,
BY
Davis Lindsey Hibben + Noyes
Attys.

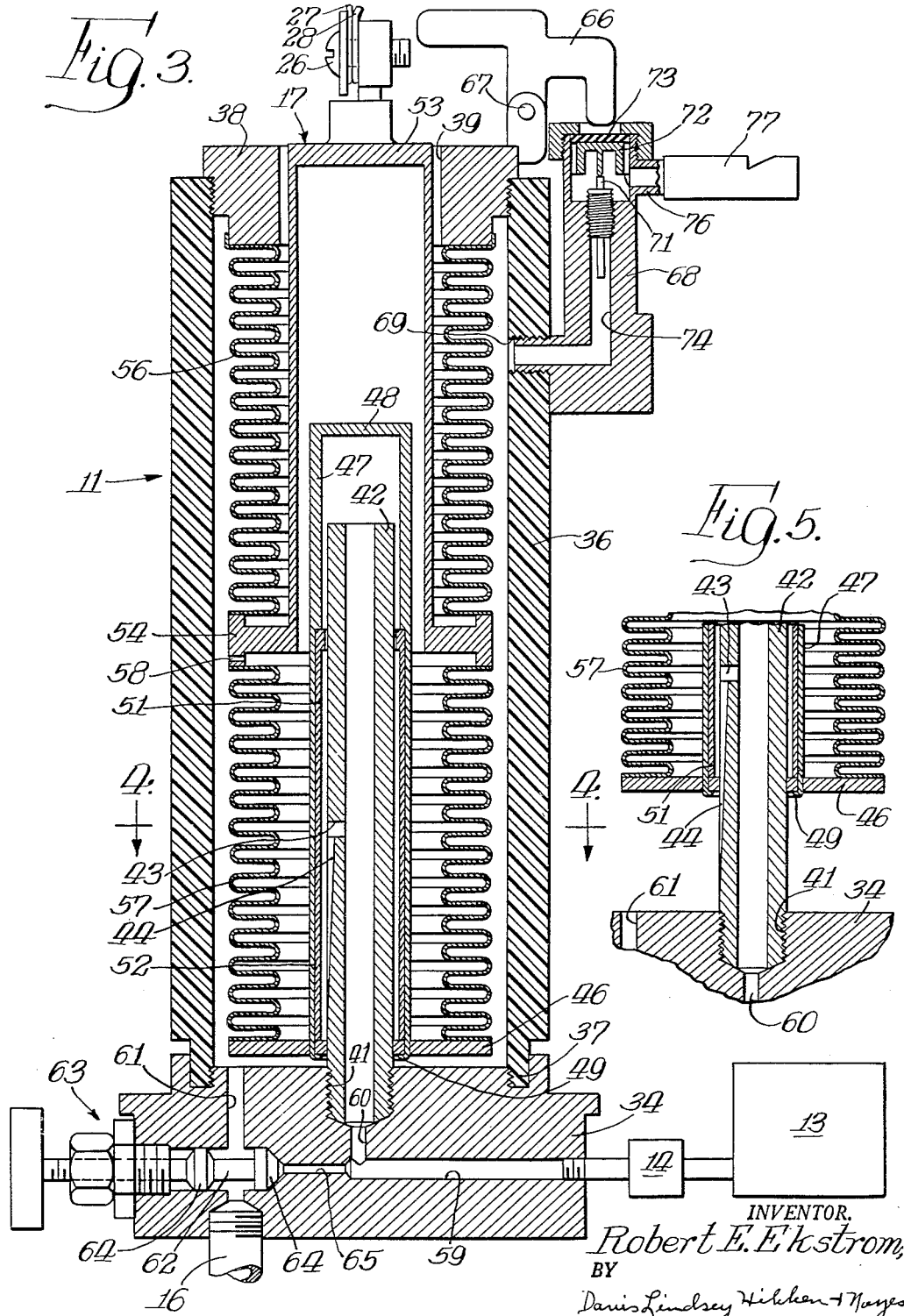

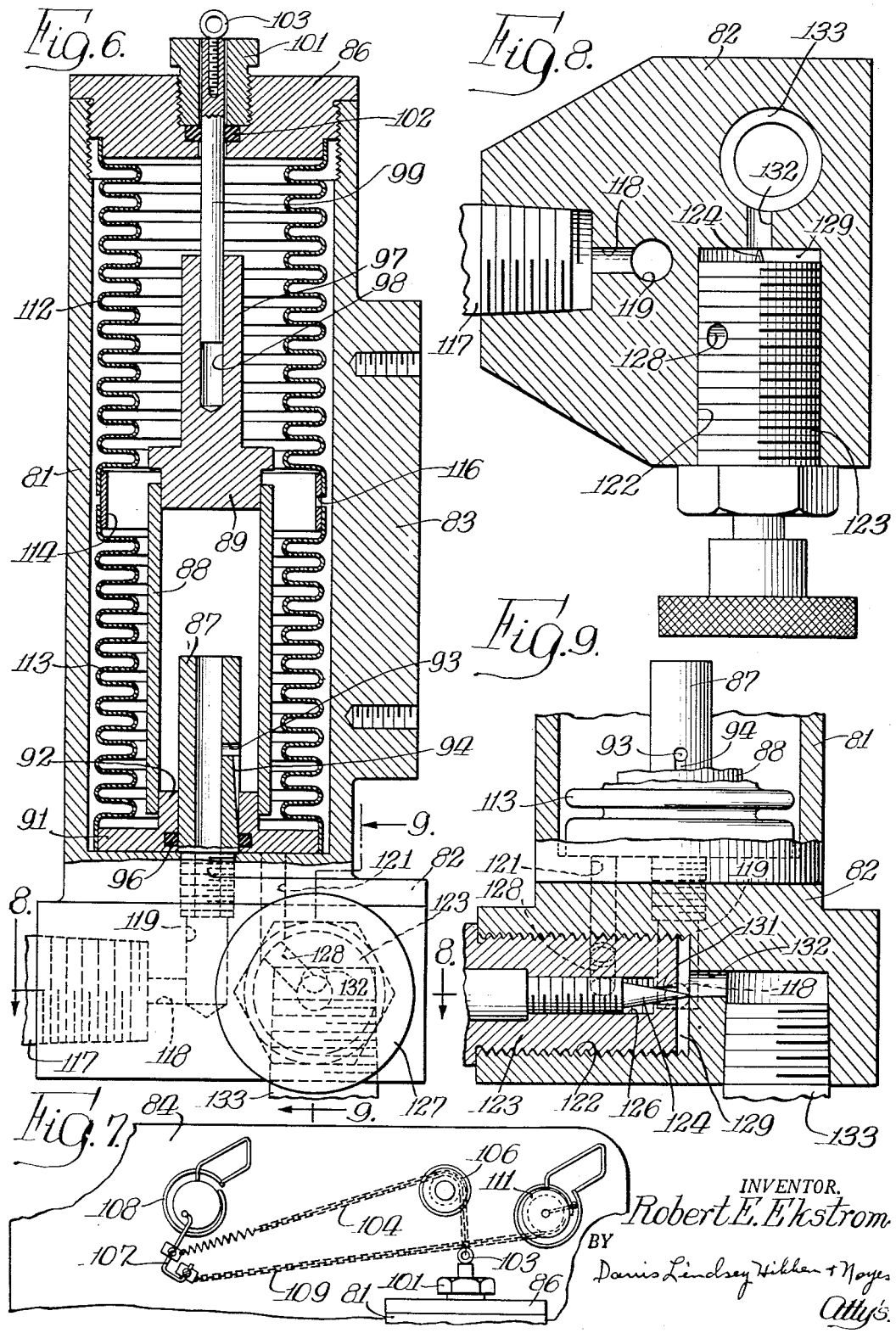

United States Patent Office 2,727,388
Patented Dec. 20, 1955

2,727,388

FLOW METER

Robert E. Ekstrom, Chicago, Ill., assignor to Elematic Equipment Corporation, Chicago, Ill., a corporation of Illinois Application August 2, 1952, Serial No. 302,377

6 Claims. (Cl. 73—298)

This invention relates to improvements in flow meters and more particularly to a novel device for measuring the flow of gases.

Although numerous types of industrial flow meters are available for indicating and recording the flow of fluids under widely varying conditions, there is need for a rugged yet simple and inexpensive mechanical meter for accurately measuring the flow of gases, particularly in the lower ranges of pressure and flow rate. For example, in hospitals and the like where oxygen is supplied to patients from oxygen cylinders or from an oxygen piping system, it is highly desirable to have a compact portable instrument which will accurately indicate and/or record the quantity of oxygen which is administered to the patient but which is sufficiently simple in construction and operation so that it does not require frequent calibration or adjustment.

Accordingly, a primary object of my invention is to provide a novel flow meter of the mechanical type which is relatively simple and inexpensive but is rugged enough to withstand extended usage without the need for frequent servicing.

A further object of the invention is to provide a novel flow meter which is especially adapted to measure gas flow in the lower ranges of pressure and flow rate.

Another object of the invention is to provide a novel meter of the foregoing character which can be readily connected to conventional indicating and recording devices.

Still another object of the invention is to provide a novel flow meter which finds particular utility in measuring the flow of oxygen to respirators, oxygen tents, and like medical equipment.

Other objects and advantages of the invention will become evident from the subsequent detailed description taken in connection with the accompanying drawings, wherein:

Fig. 1 is a rear elevational view of one specific embodiment of my invention as utilized in combination with an indicating and recording device;

Fig. 2 is a fragmentary top plan view as seen along the line 2—2 of Fig. 1;

Fig. 3 is an enlarged longitudinal sectional view of the flow meter portion of the apparatus shown in Fig. 1;

Fig. 4 is a fragmentary cross-sectional view taken along the line 4—4 of Fig. 3;

Fig. 5 is a fragmentary sectional view similar to Fig. 3 but showing a different operating position of the meter;

Fig. 6 is a longitudinal sectional view showing a modified form of the invention;

Fig. 7 is a fragmentary rear elevational view showing a modified connection of the invention to an indicating and recording device;

Fig. 8 is horizontal sectional view as taken along the line 8—8 of Fig. 6; and

Fig. 9 is a fragmentary vertical sectional view taken along the line 9—9 of Fig. 6.

Referring first to Figs. 1 to 5, I have illustrated therein one embodiment of my invention which is particularly adapted for use in those situations in which no substantial back pressure is encountered. In Figs. 1 and 2, the flow meter comprising this embodiment of the invention is illustrated in combination with a suitable indicating and recording apparatus. Thus, the flow meter, indicated generally at 11, is mounted on a base or support 12 and is fed with a gas, such as oxygen, from a source 13 under pressure through a flow control valve 14, the latter elements being indicated nearly diagrammatically. The oxygen or other gas thus introduced passes through the flow meter 11 and is discharged through an outlet 16 for passage to a respirator or the like.

As hereinafter described in detail, the flow meter 11 includes a cylindrical element or actuating means 17 which moves upwardly or downwardly in response to the variations in the flow rate through the meter. Mounted at the upper portion of the base 12 are a pair of pivot shafts 18 and 19 which carry an indicating needle 21 and a recording pen 22, respectively. It will be understood that the front side of the panel or support 12 is provided with a suitable scale for the indicating needle 21 and with a recording chart for the pen 22. Suitable hair spring means 23 and 24 are provided on shafts 18 and 19 for normally urging the needle 21 and the pen 22 in a predetermined direction. A screw fastener 26 is provided at the upper end of the movable element 17 for securing a pair of cables 27 and 28 thereto. The cables 27 and 28 extend in opposite directions over a pair of pulleys 29 and 31 and are secured at their opposite ends to a pair of sector elements 32 and 33 which are adjustably carried on the ends of the pivot shafts 18 and 19, respectively. It will be readily understood that as the flow responsive element 17 of the flow meter 11 moves upwardly or downwardly, the pivot shafts 18 and 19 will be rotated accordingly in response to the pull of the cables 27 and 28 or the action of the hair spring means 23 and 24. Thus, variations in the flow of gas through the meter 11 are accurately reflected by the indicating needle 21 and the recording pen 22.

In Figs. 3 to 5, the details of the construction of the flow meter 11 are shown. In this instance, the meter comprises a base 34, preferably of metal, having an upright tubular housing 36 threadedly secured at its lower end, as at 37, to the base 34. In this embodiment of the invention wherein the normal internal pressure within the meter is relatively low, the tubular housing 36 may conveniently be made of plastic. A cap or end closure member 38 having a central opening 39 is threadedly secured in the upper end of the housing 36.

The base 34 is formed with a central threaded opening 41 having secured therein an upright tubular element 42 which is open at its upper end. A radial opening or aperture 43 is provided in the wall of the tube 42 at the central portion thereof and communicates with an elongated tapered slot or groove 44 which extends downwardly from the aperture 43 toward the lower end of the tube 42. As will be evident from Figs. 3 and 5, the radial depth of the tapered groove 44 is greatest at its juncture with the aperture 43 and the depth of the groove 44 gradually diminishes in the direction of the lower end of the groove.

The flow-responsive means of the meter is in the form of a vertically movable arrangement comprising a centrally apertured disk 46 slidably disposed on the tube 42 and an elongated generally cylindrical enclosure 47 secured at its lower end to the disk 46 and having a closed upper end 48. Thus, the member 47 encloses the tube 42 with the closed end 48 being spaced slightly above the upper open end of the tube 42. In this instance, the cylindrical member 47 is secured to the disk 46 by means of a plurality of prongs 49 extending through the disk 46 and turned radially inwardly below the disk. A sleeve 51 is press-fitted in a counterbore 52 in the member 47 so that the disk 46 is clamped between the lower end of the sleeve 51 and the inwardly turned end 49 of the cylindrical member 47.

The vertically movable cylindrical element 17, hereinbefore referred to, has a closed upper end 53 for mounting the screw fastener 26, and the cylindrical portion of the element 17 extends downwardly and concentrically around the member 47 and is provided with a bottom flange portion 54. For actuating the element 17 in response to movement of the disk 46, a pair of upper and lower bellows elements 56 and 57, respectively, are provided. The lower bellows element 57 is secured at its lower end to the disk 46 and at its upper end to the flange portion 54. The upper bellows element 56 is secured at its lower end to the flange portion 54 and at its upper end to the cap 38. A radial aperture 58 is provided in the flange portion 54 for equalizing the internal and external pressures on the bellows 57.

The base 34 is provided with a horizontal passageway 59 and a communicating vertical passageway 60 for permitting the flow of gas from the valve 14 into the lower end of the tube 42 and thence into the member 47. When the disk 46 moves upwardly on the tube 42 in response to the flow of gas into the member 47, as described below in detail, the groove 44 is exposed to permit the gas to flow therethrough into the housing 36. Gas is discharged from within the housing 36 through a passage 61, around the reduced portion 62 of a by-pass spool valve 63 having enlarged portions 64 on opposite sides of the reduced portion 62, and finally through the outlet 16. In the event that it is desired to by-pass the flow meter 11, the valve 63 is screwed outwardly to permit the inlet gas to flow directly from the passage 59 through a by-pass connection 65 to the outlet 16.

When the meter is in normal operation with the valve 63 in its innermost operating position as shown in Fig. 3, the gas under pressure enters the lower end of the tube 42 and passes upwardly therethrough into the space enclosed by the cylindrical member 47. Prior to such entry of the gas, the disk 46 is in its lowermost Fig. 3 position so that the disk substantially seals the lower end of the groove 44 by its contact with the tube 42. However, as gas under pressure flows into the member 47, the pressure therein increases until finally the cylindrical member 47 is displaced upwardly. As the member 47 thus moves upwardly, the disk 46 is likewise carried upwardly along the tube 42 so that the lower portion of the groove 44 is placed in fluid communication with the interior of the housing 36. This is clearly seen in Fig. 5 wherein the disk 46 is illustarted in elevated relation above the base 34 and the gas can thus pass freely through the groove 44 and the lower exposed portion thereof into the interior of the housing 36. The member 47 and the disk 46 thus move upwardly to a predetermined degree dependent upon the flow rate of the inlet gas until the discharge rate of the gas through the groove 44 is sufficient to hold the pressure substantially constant in the chamber within the cylinder 47.

At the same time, the movement of the disk 46 is transmitted through the bellows 57 to the flange 54 and also to the upper bellows 56 thereby effecting a responsive upward movement of the cylindrical element 17 which extends through the opening 39 in the cap 38. In the present embodiment of the invention it is desired to reduce the magnitude of the movement of the flow-responsive means before such movement is transmitted to the indicating and recording devices. By reason of the provision of the two bellows elements 56 and 57 and the element 17 operatively connected therebetween, it will be understood that movement of the disk 46 to a given extent will be reflected by a corresponding degree of movement of the flange portion 54 which, in this instance, is approximately one-half the movement of the disk 46. In other words, the two substantially identical bellows elements 56 and 57 are each expanded or compressed approximately an equal amount so that the vertical movement of the element 17 is directly proportional on a reduced scale to the movement of the disk 46.

From the foregoing explanation it will be seen that any change in the flow rate of the gas introduced to the meter 11 will produce a corresponding change in the elevation of the disk 46 by reason of the responsive action of the member 47 and this change will in turn be reflected by movement of the actuating element 17 which is in turn transmitted through the cables 27 and 28 to the indicating and recording devices as hereinbefore described.

The tapered construction of the groove 44 permits an accurate measurement of the rate of gas flow over a substantially wide range of flow rates. At the higher flow rates, the disk 46 will tend to be lifted to a large extent but such upward movement of the disk 46 exposes or uncovers an increasingly larger portion of the groove 44 so that the gas escapes at a more rapid rate and the float member 48 is retained in operable relation even at relatively high flow rates. In opposite fashion, at lower gas flow rates the disk 46 is lifted only slightly along tube 42 and a correspondingly small portion of the tapered groove 44 is exposed so that the gas escapes at a relatively low flow rate. In each case the disk 46 automatically positions itself on the tube 47 so that the porting area of the groove 44 is adequate to discharge gas at the particular flow rate at which the gas is being introduced to the meter. Thus, the tube 47 with its tapered groove 44 and the movable disk 46 constitute in effect a variable discharge orifice.

The bellows members 56 and 57 function primarily in the nature of resilient or spring elements for transmitting motion of the disk 46 to the element 17 and there is no reliance upon changing differential pressures between the exterior and interior of the bellows elements to produce any normal operating effect of the instrument. Thus, it will be seen that by reason of the vent aperture 58 both the exterior and the interior of the bellows 57 as well as the exterior of the bellows 56 are subjected to the outlet gas pressure from the meter. Because of the enlarged aperture 39 in the cap 38, the interior of bellows 56 is subjected to atmospheric pressure. For normal usage of this particular embodiment of the invention, e. g. in measuring the flow of oxygen to a respirator or the like, there is no substantial back pressure at the outlet 16 so that the bellows 56 is not normally influenced by any differential between its exterior and interior pressures.

However, in the event that there is an obstruction in the outlet line and a back pressure is built up within the housing 36, it will be seen that the bellows 56 which has only atmospheric pressure at its interior will be greatly compressed so that the shiftable element 17 is moved upwardly to a relatively large extent even though the disk 46 may not move to a corresponding degree. A safety device is provided for such occasions and comprises a lever 66 which is pivoted, as at 67, at the upper end of the instrument and is adapted to be engaged by the upper end of the member 17 when the latter is elevated to an excessive height as just described. A safety valve comprising a housing 68 is secured to one side of the meter housing 36 and communicates with the interior of the latter through an aperture 69. A spring-pressed valve member 71 is provided in the housing 68 and is adapted to be depressed by the action of an actuator 72 disposed thereabove. Upon pivotal movement of the lever 66, a diaphragm 73 disposed above the actuator 72 is depressed and the actuator 72 opens the valve member 71 to permit the escape of high pressure gas from within the instrument housing 36 through a passage 74 in the valve housing and thence outwardly through a vent 76 which may have a warning whistle 77 mounted thereon.

In Figs. 6 to 9, I have illustrated a modified form of the invention which is particularly useful for operation at higher pressures although the general operating principle is substantially the same as in the first embodiment of the invention. Thus, the device comprises an upright hollow housing 81 having an integral base portion 82 and a laterally projecting attaching portion 83 by means of which the flow meter may be secured to a panel 84 (Fig. 7). A cap or closure member 86 is threadedly secured in the upper end of the housing 81.

As in the first form of the invention, a tube 87 is threadedly secured in the base portion 82 and extends upwardly within the housing. By means hereinafter described, inlet oxygen or other fluid to be measured is introduced into the bottom of the tube 87. Disposed concentrically around the tube 87 is a cylindrical enclosure 88 which is closed at its upper end by plug 89 and is secured at its bottom end to a disk 91 having a tubular boss 92 disposed in slidable relation around the tube 87. As before, the tube 87 is provided with an aperture 93 and a tapered groove 94 extending downwardly therefrom at the exterior of the tube. The disk 91 is provided with a sealing ring 96 in sliding contact with the tube 87. For transmitting the movements of the enclosure 88, the plug 89 is formed with an elongated extension 97 having bore 98 into which is rigidly fitted a stem 99 extending outwardly through the cap 86 and through a packing nut 101 which is threaded in the cap 86. A sealing ring 102 is provided in the cap 86 around the stem 99 for preventing the escape of gas from the housing.

It will be understood that the enclosure 88 is movable upwardly and downwardly relative to the tube 87 in response to variations in the inlet flow rate of the fluid introduced through the tube 87. As the enclosure 88 moves upwardly or downwardly, the stem 99 undergoes a corresponding movement through the packing nut 101. An eyelet 103 is provided at the upper end of the stem 99 and is connected to a chain 104 (Fig. 7) which passes over a pulley 106 and is operatively connected to a lever arm 107 on the hairspring mechanism, indicated at 108, of a recording pen. Another chain 109 is also connected to the lever arm 107 and extends to a smaller hairspring mechanism 111 which is connected to an indicating needle. Thus, vertical movement of the stem 99 responsive to variations in inlet flow rate to the meter is transformed into appropriate movements of the flow-recording and flow-indicating mechanisms.

As in the first described form of the invention, a pair of upper and lower bellows elements 112 and 113 are provided for resiliently urging the disk member 91 downwardly toward completely sealed or closed position of the groove 94. The upper end of the upper bellows 112 and the lower end of the lower bellows 113 are securely fastened to the cap 86 and the disk 91, respectively. The adjacent inner ends of the two bellows members are fastened to a connecting collar 114 which is provided with a radial aperture 116 so that the interior and exterior pressures on the bellows are equalized.

Oxygen or other fluid is admitted to the device through an inlet pipe 117 threaded into a suitable bore in the base 82. From the inlet 117, the fluid passes through a connecting passageway 118 into the bottom of an upright bore 119 which communicates with the lower end of the tube 87. As the disk 91 moves upwardly along the tube 87 in response to the introduction of fluid into the instrument, a corresponding portion of the tapered groove 94 will be exposed to permit the discharge of fluid from the enclosure 88 into the housing 81. Thence, the fluid passes downwardly through a bore 121 which terminates within an enlarged threaded valve opening 122 provided in the base 82 at right angles to the inlet 117.

A valve body 123 is threadedly secured in the opening 122 and an elongated needle valve member 124 is adjustably carried in a threaded bore 126 in the valve body 123 for movement inwardly and outwardly thereof by means of an exterior handle portion 127. The valve body 123 has a radial passage 128 which is adapted to be disposed angularly (Fig. 6) in register with the lower end of the bore 121 so that when the valve member 124 is retracted, as in Fig. 8, the discharge fluid from the housing 81 can pass through the aligned passageways 121 and 128 and into the inner threaded bore 126 of the valve body 123. As will be clearly seen from Figs. 8 and 9, the valve body 123 terminates slightly before the inner end of the threaded opening 122 to provide a space or chamber 129. Thus, fluid can pass from the central threaded passage 126 of the valve body 123 through a connecting aperture 131 and thence into the chamber 129. From the latter, the fluid passes through a connecting passageway 132 and thence downwardly through an outlet pipe 133 threaded into the base 82. In this embodiment of the invention it will be understood that the valve member 124 constitutes a throttle valve for controlling the flow of gas through the instrument and that no provision is made for bypassing the flow meter.

From the foregoing it will be seen that my invention fulfills the need for a small, accurate, and inexpensive gas measuring device which has particular advantages for hospital use where it is desired to accurately measure the amount of oxygen which is administered to a patient. The device can be connected directly to the piping of hospital oxygen systems or can be used with individual oxygen cylinders. The meter has been found to be particularly accurate in the low ranges of flow rate, e. g. from 0 to 15 liters per minute. Moreover, the operating principle of my device is applicable not only in those instances where no substantial back pressure is encountered but also may be used with hospital equipment in which back pressures as high as about 30 pounds per square inch are produced.

Although the invention has been described in connection with certain specific structural embodiments thereof, it will be understood that various modifications and equivalent structures may be resorted to without departing from the scope of the invention as defined in the appended claims.

I claim:

1. A flow meter comprising an upright elongated tubular element having a longitudinal groove at its exterior, said groove tapering radially of the tubular element, means for introducing a fluid to be measured into the lower end of said element, and movable enclosure means surrounding said tubular element and mounted over the upper end thereof and movable in response to variations in flow rate of the fluid introduced into said tubular element, said movable enclosure means having a closed upper end and an apertured element slidably mounted on said tubular element and cooperable therewith for exposing therewith varying cross-sectional areas of said groove in response to said variations in flow rate, and the end of the groove of greatest radial depth being in fluid communication with the interior of said tubular element whereby to permit varying amounts of fluid to be discharged through said groove corresponding to different inlet flow rates.

2. A flow meter comprising a base, an upright housing on said base, an elongated tube secured to said base and extending upwardly within said housing, said base having fluid passages therein to permit the introduction of a fluid to be measured into the lower end of said tube and to permit fluid to be discharged from the interior of the housing, a generally cylindrical enclosure movably mounted over the upper end of said tube within said housing and including a portion having a sliding fit with said tube, said enclosure having a closed upper end and being movable along said tube in response to variations in inlet flow rate of said fluid, and variable orifice means comprising an elongated radially tapered groove at the exterior of said tube, the end of the groove of greatest radial depth being in fluid communication with the interior of said tube, and said groove cooperating with said portion of said enclosure for discharging fluid from said enclosure into said housing at varying flow rates corresponding to said variations in inlet flow rate.

3. A flow meter comprising an upright housing having a base portion at its lower end and a closure at its upper end, an elongated tube secured to said base portion and extending upwardly within said housing, said base portion having fluid passages therein to permit the introduction of a fluid to be measured into the lower end of said tube and to permit fluid to be discharged from the interior of the housing, a movable enclosure mounted over the upper end of said tube within said housing, said enclosure having a closed upper end and including an apertured element having a sliding fit with said tube and said enclosure being movable along said tube in response to variations in inlet flow rate of said fluid, variable orifice means comprising an elongated tapered groove at the exterior of said tube, the radial depth of the groove increasing in an upward direction and the upper end of said groove having the greatest radial depth being in fluid communication with the interior of said tube whereby to cooperate with said apertured element for discharging fluid from said enclosure into said housing at varying flow rates corresponding to said variations in inlet flow rate, and resilient means operatively connected to said closure and to said apertured element for normally urging the latter downwardly toward the narrow end of said groove.

4. The device of claim 3 further characterized in that said resilient means comprises a bellows element.

5. A flow meter comprising an upright hollow housing having a base at its lower end and a closure at its upper end, an elongated tube secured to said base and extending upwardly within said housing, said base having fluid passages therein to permit the introduction of a fluid to be measured into the lower end of said tube and to permit fluid to be discharged from the interior of the housing, a cylindrical enclosure having a closed upper end and disposed concentrically over the upper end of said tube within said housing, an apertured disk element secured to the lower end of said enclosure and having a sliding fit with said tube, said enclosure being movable along said tube in response to variations in inlet flow rate of said fluid, variable orifice means comprising a longitudinal tapered groove at the exterior of said tube, the groove having an increasing radial depth in the direction of the upper end of the tube and the upper end of the groove having the greatest radial depth being in fluid communication with the interior of said tube whereby to cooperate with said disk element for discharging fluid from said enclosure into said housing at varying flow rates corresponding to said variations in inlet flow rate, elongated resilient bellows means secured at its ends to said closure and to said disk element and disposed intermediate said enclosure and said housing, and elongated actuating means secured to an intermediate portion of said bellows means and projecting through said closure at the upper end of the housing for connection to an indicating or recording device whereby movement of said enclosure within the housing is transmitted through said bellows means to said actuating means.

6. A flow meter comprising an upright hollow housing having a base portion at its lower end and a closure at its upper end, an elongated tube secured to said base and extending upwardly within said housing, said base having fluid passages therein to permit the introduction of a fluid to be measured into the lower end of said tube and to permit fluid to be discharged from the interior of the housing, a generally cylindrical enclosure disposed concentrically around said tube and enclosing the upper end thereof, said enclosure being closed at its upper end and being provided with a bottom portion having said tube extending therethrough in close-fitting sliding relation therewith and said enclosure being movable along said tube in response to variations in inlet flow rate of said fluid, variable orifice means comprising a longitudinal tapered groove at the exterior of said tube, the groove having an increasing radial depth in the direction of the upper end of the tube and the upper end of the groove having the greatest radial depth being in fluid communication with the interior of said tube whereby to cooperate with said bottom portion of said enclosure for discharging fluid from said enclosure into said housing at varying flow rates corresponding to said variations in inlet flow rate, elongated resilient bellows means secured at its ends to said closure and to said bottom portion of said enclosure and disposed intermediate said enclosure and said housing, and an elongated actuating stem operably secured to the upper end of said enclosure for movement therewith and projecting upwardly through said closure for connection to an indicating or recording device.

References Cited in the file of this patent

UNITED STATES PATENTS

| | | |
|---|---|---|
| 1,454,301 | Van Hise | May 8, 1923 |
| 1,499,839 | Nicholson | July 1, 1924 |
| 1,980,761 | Mock | Nov. 13, 1934 |
| 2,372,166 | McCarty | Mar. 20, 1945 |
| 2,417,352 | Cox | Mar. 11, 1947 |

FOREIGN PATENTS

| | | |
|---|---|---|
| 140,264 | Germany | May 13, 1903 |
| 141,032 | Germany | May 13, 1903 |